No. 776,844. PATENTED DEC. 6, 1904.
J. HUDLEMEYER & T. S. RIPPEY.
SOD CUTTER.
APPLICATION FILED JUNE 30, 1904.
NO MODEL. 2 SHEETS—SHEET 2.
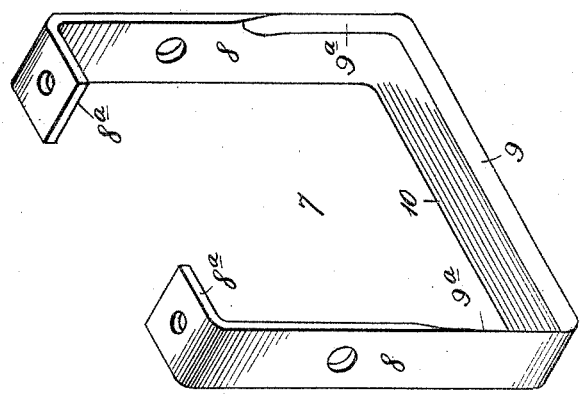
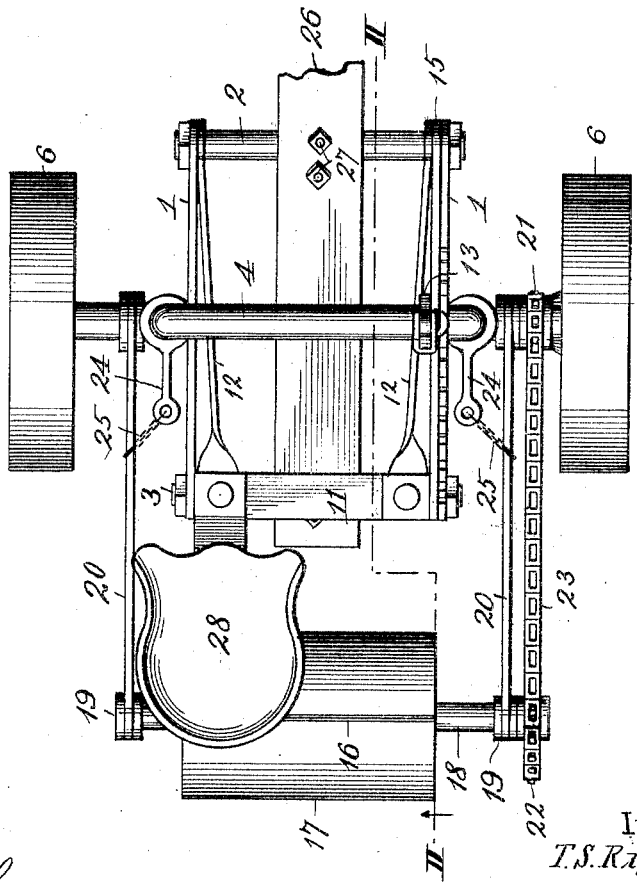
Witnesses:
A. McArthur
J. Moore
Inventors:
T. S. Rippy
and J. Hudlemeyer
By F. G. Fischer
Atty No. 776,844. Patented December 6, 1904.

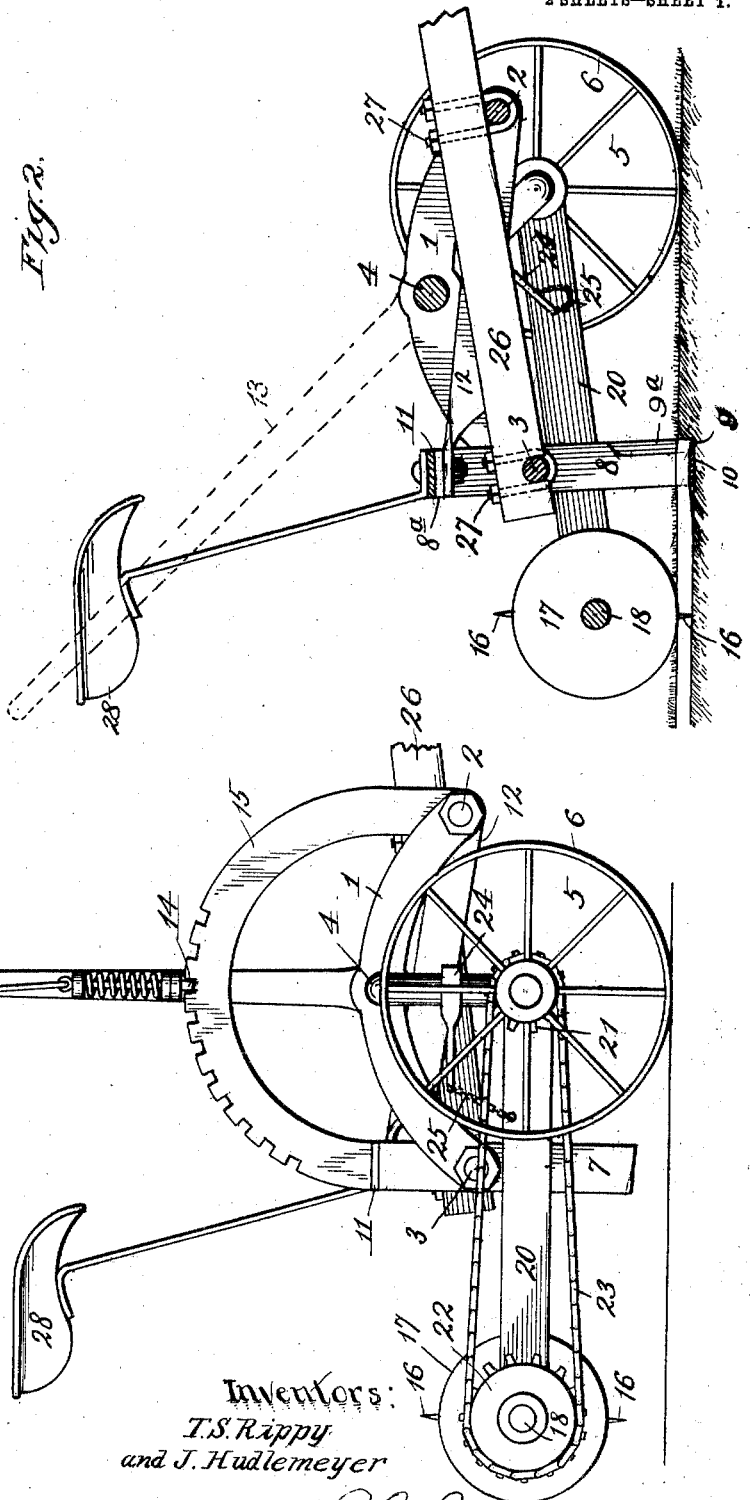

UNITED STATES PATENT OFFICE.

JOHN HUDLEMEYER AND THOMAS S. RIPPEY, OF LIBERTY, MISSOURI.

SOD-CUTTER.

SPECIFICATION forming part of Letters Patent No. 776,844, dated December 6, 1904.

Application filed June 30, 1904. Serial No. 214,810. (No model.)

*To all whom it may concern:*

Be it known that we, JOHN HUDLEMEYER and THOMAS S. RIPPEY, citizens of the United States, residing at Liberty, in the county of Clay and State of Missouri, have invented certain new and useful Improvements in Sod-Cutters, of which the following is a specification.

Our invention relates to improvements in sod-cutters; and our object is to provide a machine of this character whereby sod may be quickly cut into pieces of uniform size.

The invention consists in the novel construction, arrangement, and combination of parts hereinafter described, and pointed out in the claims; and in order that it may be fully understood reference will now be made to the accompanying drawings, in which—

Figure 1 represents a side elevation of the machine in an inoperative position. Fig. 2 is a vertical section of the same, taken on line II II of Fig. 3, showing the knives in an operative position. Fig. 3 is a plan view of the machine. Fig. 4 is a detail perspective view of the knife for cutting the sod into longitudinal strips.

In carrying out the invention we employ a rectangular frame comprising arched side bars 1, connected at their opposite ends by transverse rods 2 and 3. Said frame is mounted upon an arched axle 4, extending through the central portions of side bars 1 and provided at their lower outturned ends with carrying-wheels 5, having broad tires 6 to prevent them from sinking into the sod.

7 designates a U-shaped knife secured near the central portion of its vertical arms 8 to rod 3 and having a cutting edge 9 at the front side of its lower transverse portion 10 for cutting the bottom of the sod and cutting edges $9^a$ extending part way up arms 8 for cutting the sides of the sod. Cutting edge 9 inclines upwardly and backwardly (see Fig. 2) in order to assist in holding the knife down into the ground while cutting the sod. The upper ends of arms 8 turn inwardly, as indicated by $8^a$, and are connected by a transverse bar 11. The knife is secured from rocking on rod 3 by braces 12, secured at their opposite ends to bar 11 and transverse rod 2. Knife 7 is raised and lowered by a hand-lever 13, rigidly secured at its lower end to the upper transverse portion of axle 4, and is held in any desired position by the usual latch-pin 14, adapted to engage the notches of a segment 15, secured at its opposite ends to rods 2 and 3.

The longitudinal strips of sod cut by knife 7 are cut into pieces of uniform length by a pair of transverse blades 16, secured diametrically opposite each other on a drum 17, rigidly mounted upon a transverse shaft 18, journaled at its opposite ends in bearings 19 at the rear terminals of draft-bars 20, pivotally secured at their forward terminals to the lower outturned ends of axle 4. Shaft 18 is driven by one of the carrying-wheels 5 through the instrumentality of sprocket-wheels 21 22, mounted, respectively, upon one of the wheel-hubs and shaft 18 and connected by an endless sprocket-chain 23.

24 designates a pair of rearwardly-extending arms rigidly secured to the vertical portions of the axle and provided with chains 25, attached at their lower ends to draft-bars 20. With this connection blades 16 are raised and lowered simultaneously with knife 7.

The machine is drawn forward by a team hitched to a tongue 26, secured at its rear portion with stirrups 27 to rods 2 3.

A seat 28 adjacent to lever 13 is provided for the driver. In operation knife 7 and the drum are lowered to the ground by pulling lever 13 backwardly, which operation throws wheels 6 forward and lowers the frame of the machine. (See Fig. 2.)

The thickness of the sod is regulated by depressing knife 7 more or less through the operation of the hand-lever and connecting parts.

Sprocket-wheels 21 22 and connecting sprocket-chain 23 may be dispensed with by making the drum heavy enough to prevent its slipping when its blades contact with the sod; but when this driving mechanism is provided a clutch of ordinary construction may be employed for drawing sprocket-wheel 21 out of gear in order to stop the rotation of the drum when the latter is raised from the ground.

While we have shown the preferred construction of our machine, we of course reserve the right to make such changes as properly fall within the appended claims.

Having thus described our invention, what we claim, and desire to secure by Letters Patent, is—

1. A sod-cutter consisting of a wheeled frame, a knife suitably secured to the frame for cutting the sod into longitudinal strips, blades rotatably mounted in the frame, and means for simultaneously raising and lowering the knife and the blades.

2. A sod-cutter consisting of a wheeled frame, a knife secured to said frame for cutting the sod into longitudinal strips, a pair of draft-bars 20 pivotally secured at their forward terminals to the axle of the frame, a drum mounted upon a shaft journaled in the rear terminals of the draft-bars, transverse blades secured to the periphery of the drum, and means for simultaneously raising and lowering the knife and the blades.

3. A sod-cutter comprising a frame, an arched axle pivotally secured to said frame, carrying-wheels mounted upon said axle, a hand-lever rigidly secured to said axle, a knife secured to the frame, draft-bars pivotally secured at their forward ends to the axle, a drum rigidly mounted upon a shaft journaled in the rear terminals of the draft-bars, transverse blades secured to the periphery of the drum, sprocket-gearing connecting the drum-shaft to one of the carrying-wheels, a pair of rearwardly-extending arms secured to the axle, and chains attached at their opposite ends to said arms and the axle.

In testimony whereof we affix our signatures in the presence of two witnesses.

JOHN × HUDLEMEYER.
mark

THOMAS × S. RIPPEY.
mark

Witnesses:
JAMES C. DAVIS,
CLAUDE HARDWICKE.